US007904381B1

United States Patent
Tatang et al.

(10) Patent No.: US 7,904,381 B1
(45) Date of Patent: Mar. 8, 2011

(54) SYSTEMS, METHODS, AND COMPUTER PRODUCTS FOR OPTIMIZING THE SELECTION OF COLLATERAL

(75) Inventors: Menner A. Tatang, Great Falls, VA (US); Martin M. Loketek, Reston, VA (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 145 days.

(21) Appl. No.: 12/010,988

(22) Filed: Jan. 31, 2008

Related U.S. Application Data

(60) Provisional application No. 60/898,721, filed on Feb. 1, 2007.

(51) Int. Cl.
*G06Q 40/00* (2006.01)
(52) U.S. Cl. .......................................... 705/38
(58) Field of Classification Search .................. 705/38
See application file for complete search history.

(56) References Cited

U.S. PATENT DOCUMENTS

| 7,310,618 B2* | 12/2007 | Libman ........................ 705/38 |
| 7,502,755 B1* | 3/2009 | Brickman et al. .......... 705/36 R |
| 7,512,559 B1* | 3/2009 | Snyder et al. .................... 705/37 |
| 7,558,756 B1* | 7/2009 | Wesly et al. ..................... 705/38 |
| 2005/0102226 A1* | 5/2005 | Oppenheimer et al. ........ 705/38 |
| 2007/0016520 A1* | 1/2007 | Gang et al. ...................... 705/38 |

OTHER PUBLICATIONS

NPL Ref-1: Bank News, v102, n1, p. 12-14, Jan. 2002; Artc Ref No. BAW-2068-5.*
NPL Ref-2: Supplier No. 130571790 ; Thomson AutoEx; PR Newwire, pNA; Mar. 21, 2005.*
NPL Ref-3: Customer to deliver Compelling Services; usiness Wire; Dec. 10, 2001.*

\* cited by examiner

*Primary Examiner* — Hani Kazimi
*Assistant Examiner* — Hatem Ali
(74) *Attorney, Agent, or Firm* — Finnegan, Henderson, Farabow, Garrett & Dunner, LLP

(57) ABSTRACT

Systems, methods, and computer program products are provided for increasing the return from a pool of loans for a company involved in the guarantee and securitization of such loans. In one exemplary embodiment, a computer-implemented method comprises creating a plurality of sub-pools in which to place loans from the pool of loans; determining, using one or more processors, an external value assessment for one or more loans from the pool and an internal value assessment for the one or more loans; identifying a difference between the external and internal value assessments; and selecting a sub-pool from the plurality of sub-pools to place the one or more loans based upon the identified difference.

29 Claims, 9 Drawing Sheets

Market Model Input — 710

| Loan | Loan Size | FICO | LTV | Rate | Investor |
|---|---|---|---|---|---|
| 1 | 100,000 | 600 | 80 | 6% | 1 |
| 2 | 100,000 | 600 | 80 | 6% | 0 |
| 3 | 100,000 | 700 | 80 | 6% | 1 |
| 4 | 100,000 | 700 | 80 | 6% | 0 |

Market Model Output — 720

| Loan | Market Model Result (bps) |
|---|---|
| 1 | 10.0 |
| 2 | 8.0 |
| 3 | 8.0 |
| 4 | 6.0 |

FIG. 7

Internal Model Input — 810

| Loan | Loan Size | FICO | LTV | Rate | Refinance |
|---|---|---|---|---|---|
| 1 | 100,000 | 600 | 80 | 6% | 1 |
| 2 | 100,000 | 600 | 80 | 6% | 0 |
| 3 | 100,000 | 700 | 80 | 6% | 0 |
| 4 | 100,000 | 700 | 80 | 6% | 1 |

Internal Model Output — 820

| Loan | Internal Model Result (bps) |
|---|---|
| 1 | 10.0 |
| 2 | 8.0 |
| 3 | 6.0 |
| 4 | 8.0 |

FIG. 8

Optimization Model Input

| Loan | Loan Size | FICO | LTV | Rate | Investor | Refinance | Market Model Result (bps) | Internal Model Result (bps) |
|---|---|---|---|---|---|---|---|---|
| 1 | 100,000 | 600 | 80 | 6% | 1 | 1 | 10.0 | 10.0 |
| 2 | 100,000 | 600 | 80 | 6% | 0 | 0 | 8.0 | 8.0 |
| 3 | 100,000 | 700 | 80 | 6% | 1 | 0 | 8.0 | 6.0 |
| 4 | 100,000 | 700 | 80 | 6% | 0 | 1 | 6.0 | 8.0 |

⌒ 910

Optimization Model Output ⌒ 920

| Loan | Target Pool |
|---|---|
| 1 | SELL |
| 2 | KEEP |
| 3 | KEEP |
| 4 | SELL |

Optimization Summary ⌒ 930

| | Keep | Sell |
|---|---|---|
| Market Model Result (bps) | 8.0 | 8.0 |
| Internal Model Result (bps) | 7.0 | 9.0 |
| Pool UPB | 200,000 | 200,000 |
| FICO | 650 | 650 |
| LTV | 80 | 80 |

FIG. 9

SYSTEMS, METHODS, AND COMPUTER PRODUCTS FOR OPTIMIZING THE SELECTION OF COLLATERAL

RELATED APPLICATIONS

This application claims the benefit of U.S. Provisional Application No. 60/898,721 filed Feb. 1, 2007, which is incorporated herein by reference in its entirety.

FIELD OF THE INVENTION

The present invention generally relates to financial instruments and to systems, methods, and computer products for the selection of collateral related to these financial instruments. More particularly, the invention relates to systems, methods, and computer products for selecting a sub-pool of loans from a pool of loans, such that the sub-pool of loans meets specified business objectives, investment guidelines, and/or constraints of a company.

BACKGROUND

Many consumers that purchase a home borrow funds from a lender (e.g., banks, thrifts, mortgage companies, credit unions, and online lenders) and grant the lender a security interest in the home. The legal document whereby the consumer uses the property as collateral for repayment of the loan is commonly known as a mortgage or mortgage loan. Lenders sell many of the mortgage loans that they originate into a secondary mortgage market. The Federal Home Loan Mortgage Corporation (Freddie Mac), the Federal National Mortgage Association (Fannie Mae), the Government National Mortgage Association (Ginnie Mae), and Wall Street investment institutions (private label market) are participants in the secondary mortgage market. By buying mortgage loans in the secondary mortgage market, participants like Freddie Mac provide lenders with capital that allows them to meet consumer demand for additional home mortgages. The secondary market for mortgage loans renders available a supply of money for housing, thus lowering the cost of money and ultimately lowering the cost of home ownership for consumers.

In exchange for mortgage loans sold in the secondary market, the seller may either receive cash or securities. A company purchasing mortgage loans in the secondary mortgage market may generate capital by holding on to the purchased mortgage loans and keeping the funds homeowners pay for their mortgage (e.g., principal and interest). A company may also generate capital by pooling (e.g., bundling together into large groups) the purchased mortgage loans, which may be used to back the issuance of a mortgage backed securities (MBS) that are subsequently sold on the open market to investors. An MBS represents an undivided beneficial interest in one or more pools of mortgage loans. Sometimes an MBS is referred to as a "pass-through" security, because the funds homeowners pay for their mortgage are "passed through" to the MBS investors. In general, a mortgage pool is a positively identified group of mortgage loans combined for resale to individuals or entities. The process of forming the mortgage pools and issuing an MBS is called securitization.

By guaranteeing an MBS, the guarantor assumes the credit risk of the MBS. That is, regardless of whether the borrowers repay the mortgage loans that back the MBS, the guarantor guarantees that the credit risk dependent return that is passed through the MBS will be paid to the investor in a timely manner. As a result, the primary market lenders are infused with funds from debt investors who would not otherwise invest in residential mortgages because of the financial risk. The guarantor may charge a guarantee fee (commonly referred to as a "g-fee"), typically a portion of a percentage point of the mortgage loan coupon rate, for guaranteeing the credit risk dependent return. The market determines the fair price for the g-fee associated with a pool of loans or an MBS. The fair price of the g-fee takes into account an assessment of the risks associated with the mortgage loan, often determined by market models, such as those used by rating agencies (e.g., S&P, Moody's, Fitch, and DBRS).

A company buying mortgage loans in the secondary market may buy loans through a flow process or a bulk process. In the flow process, the seller delivers to the buyer mortgage loans that are in conformance with predetermined guidelines set forth by the seller and the buyer. For example, the guidelines may require that all loans within a delivered pool of loans conform to certain characteristics, such as loan amount, payment terms, interest rate, loan term, and the like. For loans acquired through the flow process, the buyer will guarantee the loan for a predetermined g-fee, normally established through a long-term contract.

In the bulk process, the seller delivers to the buyer a loan pool that is comprised of a variety of loans and asks the buyer to quote a g-fee for this pool. Because under the bulk process some of the loans within the delivered loan pool may not conform to certain guidelines, the buyer may be unwilling to accept the credit risk associated with all the mortgage loans within the loan pool and may therefore refuse to guarantee all loans delivered in the bulk process. As a result, the seller may be forced to find another buyer who is willing to guarantee the remaining loans. To prevent this, the original buyer may agree to guarantee all loans within the bulk process, pool those loans that are deemed to have an unfavorable risk/return tradeoff, and then sell those risky loans on the secondary market. If the loans conform to certain guidelines, the original buyer may randomly determine which loans from a pool to sell and which loans to keep. Through the use of a random selection process, the resulting sub-pools of loans are likely to have substantially similar target credit risk ratings, both to each other and to that of the entire pool.

It is desirable to provide a system and method that would enable a company to guarantee more loans from a loan pool. The inventors have determined that a drawback to the random selection process described above is that it does not recognize that a company's internal value assessment (i.e., the company's view of the credit risk associated with the sub-pools) may be different than an external or market value assessment (i.e., the market view of the credit risk associated with the sub-pools). Moreover, if some of the loans do not conform to certain guidelines, the random selection process cannot be used.

The inventors determined that it would be desirable to enable a company to determine the difference between what the market would pay for a guarantee on a loan and the company's expected internal cost to guarantee the loan in order to thereby allow the company to leverage this difference and competitively bid a g-fee.

SUMMARY

The inventors have recognized that internal value assessment models may produce a different result than external models used in the marketplace to determine a fair g-fee. The difference can be leveraged, through the use of the present invention, to make more informed decisions about which loans to keep and which loans to sell, or more specifically, which loans to place into sub-pools, the return on which will be guaranteed (in part or in full) by a company, and which loans to be placed into sub-pools, the return on which will not be guaranteed by the company but may be guaranteed by others. The result, in accordance with embodiments of the present invention, is an improved rate of return on equity and the ability to purchase more loans, thereby improving liquidity in the mortgage funding market and reducing costs to potential homeowners. It enables the company to maintain a more consistent and continuous presence in the market for loans.

In accordance with embodiments of the invention, methods, systems, and computer products are provided for facilitating collateral selection to achieve one or more desired objectives, including the optimization of return on equity for a pool of loans. At the same time, certain required execution constraints are also satisfied, such as matching AAA subordination amount, minimum average FICO score on "sell" pool, maximum average LTV (loan-to-value) on "sell" pool, and others as described herein.

In one embodiment, a computer-implemented method is provided for increasing the return from a pool of loans for a company involved in the guarantee and securitization of such loans. The method comprises creating a plurality of sub-pools in which to place loans from the pool of loans; determining, using one or more processors, an external value assessment for one or more loans from the pool and an internal value assessment for the one or more loans; identifying a difference between the external and internal value assessments; and selecting a sub-pool from the plurality of sub-pools to place the one or more loans based upon the identified difference.

In another embodiment, a computer-readable medium including program instructions is provided for performing, when executed by a processor, a method for increasing the return from a pool of loans for a company involved in the guarantee and securitization of such loans. The method comprises creating a plurality of sub-pools in which to place loans from the pool of loans; determining, using one or more processors, an external value assessment for one or more loans from the pool and an internal value assessment for the one or more loans; identifying a difference between the external and internal value assessments; and selecting a sub-pool from the plurality of sub-pools to place the one or more loans based upon the identified difference.

In yet another embodiment, a system is provided for creating a plurality of sub-pools from a pool of loans for a company involved in the guarantee and securitization of such loans. The system comprises data storage devices for storing collateral data, market credit risk data, and internal credit risk data; a rules repository for storing market models, internal models, and optimization models; and an optimization tool communicatively connected to the data storage devices and the rules repository, the optimization tool receives collateral data, market credit risk data, internal credit risk data, market models, internal models, and optimization models and executes an optimization selection process to create a plurality of sub-pools in which to place loans from the pool of loans.

In another embodiment, a computer-implemented method is provided for increasing the return from a pool of loans for a company involved in the guarantee and securitization of the loans. The method comprises creating a plurality of sub-pools in which to place the cash flow associated with particular loans from the pool; determining, using one or more processors, an external value assessment for the timing of the cash flow associated with one or more loans from the pool and determining, using one or more processors, an internal value assessment for the timing of the cash flow associated with the one or more loans from the pool; identifying a difference between the external and internal value assessments; and selecting a sub-pool from the plurality of sub-pools to place the cash flow associated with the one or more loans based upon the identified difference.

In yet another embodiment, a computer-implemented method is provided for increasing the return from a pool of loans for a company involved in the guarantee and securitization of the loans. The method comprises receiving a plurality of loans through a flow delivery process over a predefined term; periodically determining, using one or more processors, an external value assessment for one or more of the plurality of loans and determining, using one or more processors, an internal value assessment for the one or more loans; periodically identifying a difference between the external and internal value assessments; and calculating an historical average of the identified differences over the term of the flow delivery process.

In another embodiment, a computer-implemented method is provided for optimizing selection of collateral, the collateral comprising a pool of loans. The method comprises retrieving collateral data for the loans, market credit risk data, internal credit risk data, a market model, and an internal model; creating a market model input file from the retrieved market credit risk data and market model and creating an internal model input file from the retrieved internal credit risk data and internal model; entering the market model input file into the market model to generate a market model output file and entering the internal model input file into the internal model to generate an internal model output file; creating an optimization model input file from the market model input file, internal model input file, market model output file, and internal model output file; executing an optimization selection process by entering the optimization model input file into an optimization model; and generating an optimization model output, the optimization model output including a plurality of sub-pools in which to place one or more loans from the pool of loans and an indication of which of the plurality of sub-pools to place the one or more loans.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of several further features disclosed below in the detailed description.

BRIEF DESCRIPTION OF THE DRAWINGS

The accompanying drawings, which are incorporated in and constitute a part of this specification, illustrate various features, embodiments and aspects of the invention and, together with the description, explain advantages and principles of the invention. In the drawings.

FIG. 7 illustrates exemplary inputs and outputs of a market model, in accordance with principles of the present invention;

FIG. 8 illustrates exemplary inputs and outputs of an internal model, in accordance with principles of the present invention;

FIG. 9 illustrates exemplary inputs and outputs of an optimization model, in accordance with principles of the present invention.

DESCRIPTION OF THE EMBODIMENTS

Reference will now be made in detail to exemplary embodiments of the invention, examples of which are illustrated in the accompanying drawings. Wherever convenient, similar reference numbers will be used throughout the drawings to refer to the same or like parts. The implementations set forth in the following description do not represent all implementations consistent with the claimed invention. Instead, they are merely some examples of systems and methods consistent with the invention.

Figure 1:
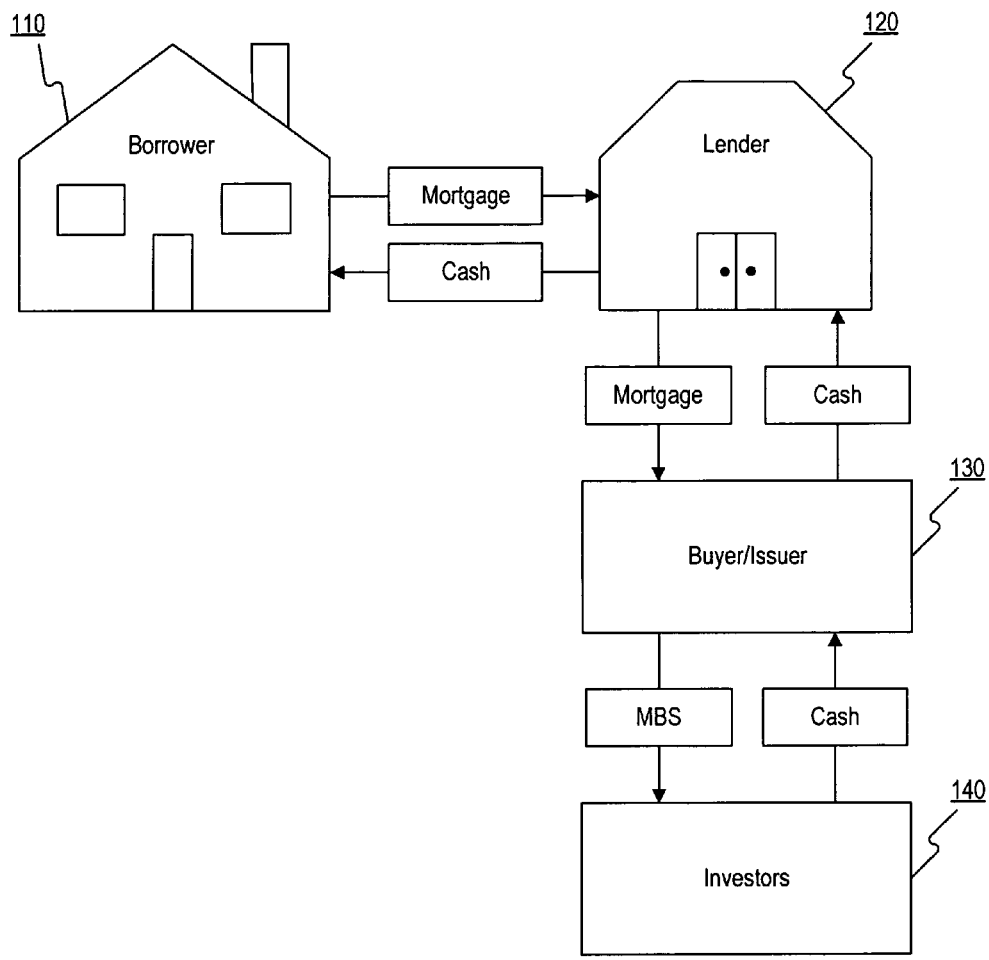
FIG. 1 is a block diagram illustrating an exemplary overview of participants in and operation of a secondary market for mortgage loans, in accordance with the principles of the present invention.

FIG. 1 is a block diagram illustrating an exemplary high-level overview of participants in and operation of a secondary market for mortgage loans. As shown in FIG. 1, the participants may include a borrower 110, a lender 120, a buyer/issuer on the secondary market 130, and investors 140. To purchase a home, a borrower 110 may borrow funds from a lender 120. Lender 120 may include a bank, thrift, mortgage company, credit union, or an online lender. In exchange for the loan, the borrower 110 may grant the lender 120 a security interest in the home through a mortgage or mortgage loan.

Lender 120 may in turn sell the mortgage loan on the secondary mortgage market to a buyer/issuer 130. Buyer/issuer 130 may include companies, such as Freddie Mac, Fannie Mae, Ginnie Mae, and Wall Street investment institutions. The funds that the lender 120 receives from the sale of the mortgage loan may be used to fund additional home purchases. The buyer/issuer 130 may in turn pool the purchased mortgage loans, and use this mortgage pool to back the issuance of an MBS that is subsequently sold on the market to one or more investors 140.

Figure 2:
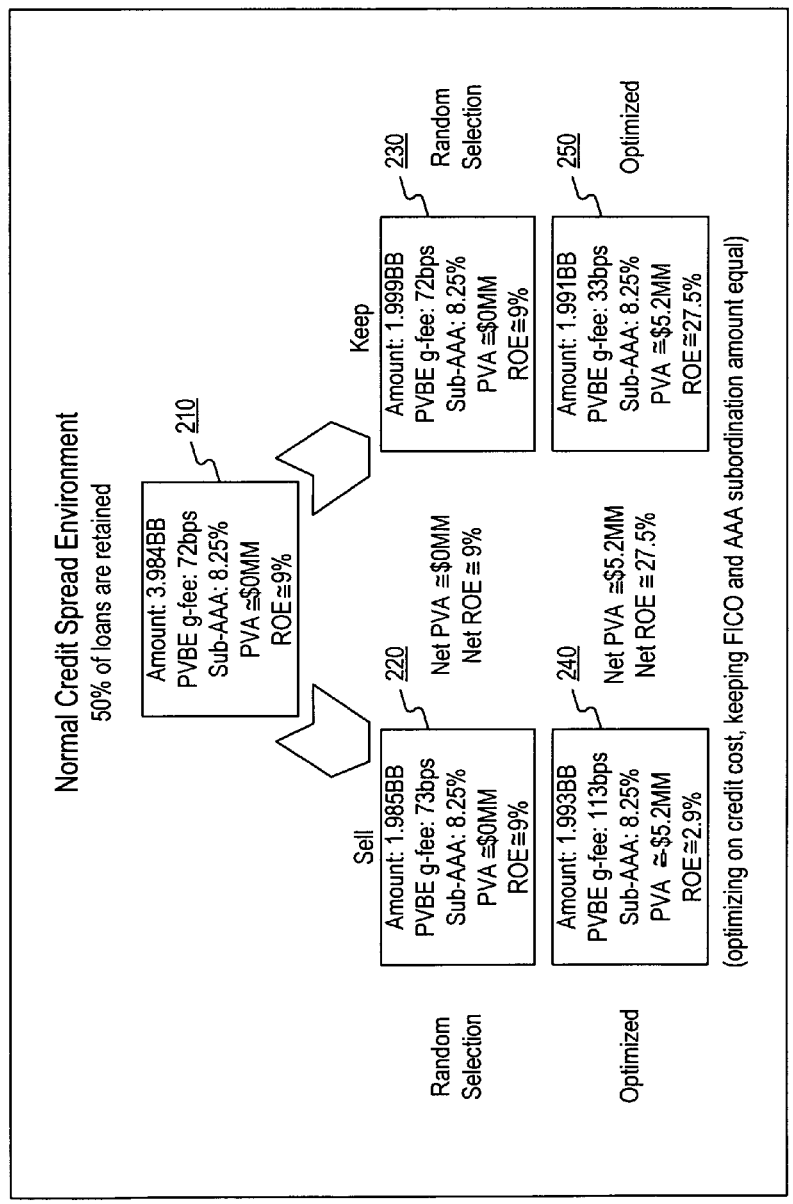
FIG. 2 is a block diagram illustrating an exemplary comparison of a collateral selection process using a random selection process and an optimization selection process, in accordance with principles of the present invention.

As discussed previously, a buyer (e.g., buyer/issuer 130) may determine which loans from a pool to sell and which loans to keep by using, for example, a random selection process. FIG. 2 is a block diagram illustrating an exemplary comparison between a selection process of selecting sub-pools of collateral from an original pool of collateral using a random selection process and an optimization selection process in accordance with principles of the present invention. For this comparison, the selection process occurs in a normal credit spread environment. A "credit spread" refers to the required additional return for taking additional credit risk. Market participants may have different views on credit spread even for a specific pool of loans. As a result, there could be a difference between the g-fee a company is willing to bid to guarantee a pool of loans based upon the company's calculated internal credit risk and the g-fee the market is willing to bid to guarantee the pool of loans based upon their calculated credit risk (i.e., the market credit risk). Accordingly, a credit spread is also considered a measure of relative credit risk.

As illustrated in FIG. 2, the original pool of collateral 210 may comprise mortgage loans with a combined value of 3.984 billion dollars, a present value of break-even credit cost without administrative and float expenses (PVBE g-fee) of 72 basis point (bps—one hundredth of a percentage point), a percentage of the mortgage loans in the pool having credit ratings of lower-than-AAA equal to 8.25%, a present value added after tax (PVA) equal to 0 dollars, and a return on equity after tax (ROE) of 9%.

The objective of the random selection process illustrated in FIG. 2 is to select 50% of the mortgage loans from the original pool 210 with the constraint that the loans selected in the sell sub-pool 220 and the keep sub-pool 230 contain the same subordination level requirement to achieve a credit rating of lower-than-AAA (i.e., 8.25%) as the original pool of loans 210. As illustrated in FIG. 2, the random selection process produces a sell sub-pool 220 and keep sub-pool 230 that has relatively the same characteristics of the mortgage loans contained within the original pool 210, with each sub-pool having half the value as the original pool 210. Accordingly, the random selection process produces no additional benefit (e.g., ROE) for splitting the original pool of loans 310 into the sell sub-pool 220 and the keep sub-pool 230.

FIG. 2 also illustrates the optimization selection process in accordance with principles of the present invention. As with the random selection process, the objective of the optimization selection process in FIG. 2 is to select 50% of the mortgage loans from the original pool 210 with the constraint that the loans selected in the sell sub-pool 240 and the keep sub-pool 250 contain the same percentage of mortgage loans with credit ratings of lower-than-AAA (i.e., 8.25%) as the original pool of loans 210. However, as illustrated in FIG. 2, the optimization selection process achieves this objective, as well as achieving an additional objective of minimizing the internal view of credit costs for the keep sub-pool 250 while maintaining a similar market view of credit cost for the sell sub-pool 240, and thereby generating a potential significant increase of the ROE.

Specifically, the ROE of the keep sub-pool 250 is now 27.5% while the ROE of the sell sub-pool 240 is now 2.9%. The increase of the ROE for the keep sub-pool 250 may provide an opportunity for a company to better compete in sourcing the overall pool of loans 210. For example, a company may offer a better g-fee bid by sharing the additional realized gain of the keep sub-pool 250 with a buyer when sourcing the loans. This may serve at least two potential purposes: one is to lower a borrower's 110 borrowing cost; and the other is to provide a company with a first look opportunity in the secondary market of loans and to maintain a presence in the market for loans.

The objective of the optimization selection process in the above example was to generate, from an original pool of loans, a sell sub-pool with a market value assessment which is substantially the same as the market value assessment of the original pool of loans. However, the objective of the optimization selection process may be modified. For example, the optimization selection process may generate a sell sub-pool wherein the market value assessment of the sell sub-pool is better than the market value assessment of the original pool of loans.

Additionally, the optimization selection process may generate or create other types of sub-pools aside from purely "keep" and "sell" sub-pools. It is envisioned that a plurality of sub-pools may be created to correspond to a range of levels of guarantee. For example, the optimization selection process may generate or create a first sub-pool in which to place loans, the credit risk dependent return of which will be guaranteed by the company at a first predetermined level. The process may also create a second sub-pool in which to place loans, the credit risk dependent return of which will be guaranteed by the company at a second predetermined level, where the first predetermined level is greater than the second predetermined level. Additional sub-pools could be created to correspond to other predetermined levels of guarantee. Furthermore, if only two sub-pools are created, the first predetermined level may be 100% and the second predetermined level may be 0%, resulting in the company fully guaranteeing the credit risk dependent return of the first sub-pool and not guaranteeing at all the credit risk dependent return of the second sub-pool, thus reverting to the example described above of "keep" and "sell" sub-pools.

Figure 3:
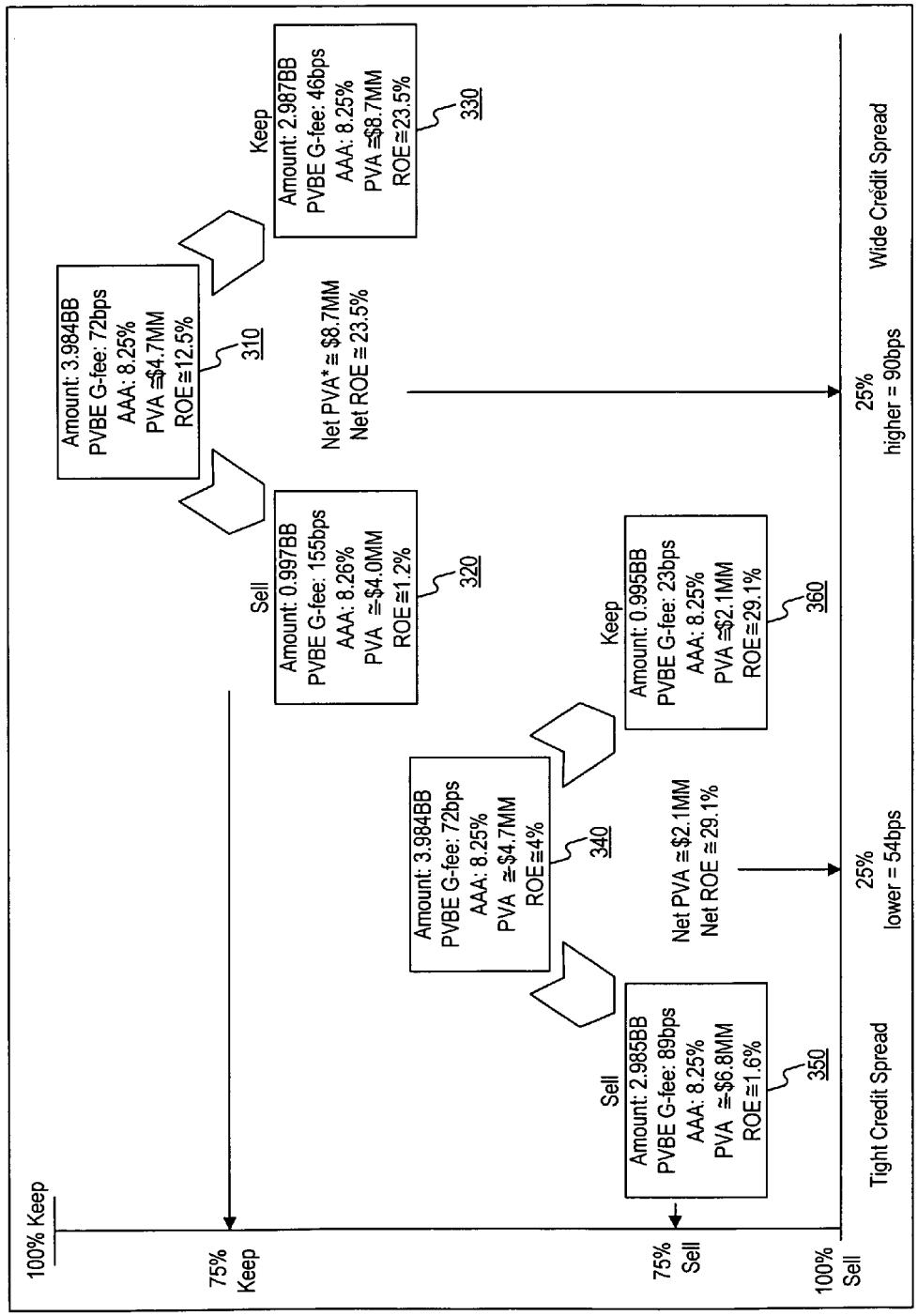
FIG. 3 is a block diagram illustrating an exemplary use of the optimization selection process in varying credit environments, in accordance with the principles of the present invention.

In addition to utilizing the optimization selection process in a normal credit spread environment, the optimization selection process may also be used for selecting collateral in both tight and wide credit spread environments. FIG. 3 illustrates the potential benefits of such an application of the optimization selection process. Specifically, FIG. 3 illustrates the use of the optimization selection process in a tight credit spread environment, that is, when the market charges a lower g-fee for a pool of loans than a company's g-fee calculated on an internal break-even cost. FIG. 3 also illustrates the use of the optimization selection process in a wide credit spread environment, that is, when the market charges a higher g-fee for a pool of loans than a company's g-fee calculated on an internal break-even cost.

When a company wishes to purchase a pool of loans during a tight credit spread environment, the company may not be able to competitively bid a g-fee because the company's g-fee may be higher than what the market is charging and the seller may therefore sell the pool of loans on the open market. On the other hand, if the company does not acquire this pool of loans, the seller may have to find another buyer and the company may be opted-out of taking new credit risk in the market. However, using the optimization selection process, the company may systematically select a set of loans to form a keep sub-pool in which the break-even credit costs are lower than what the market charges and therefore, allowing the company to be continuously present in the secondary market.

Specifically, as illustrated in FIG. 3, utilizing the optimization selection process, a pool of loans 310 with a ROE of 12.5% may be split into a keep sub-pool 330 with an ROE of 23.5% and a sell sub-pool 320 with a ROE of 1.2% in a wide credit spread environment. In addition, in a tight credit spread environment, the optimization selection process may split a pool of loans 340 with a ROE of 4% into a keep sub-pool 360 with an ROE of 29.1% and a sell sub-pool 350 with a ROE of 1.6%.

Figure 4:
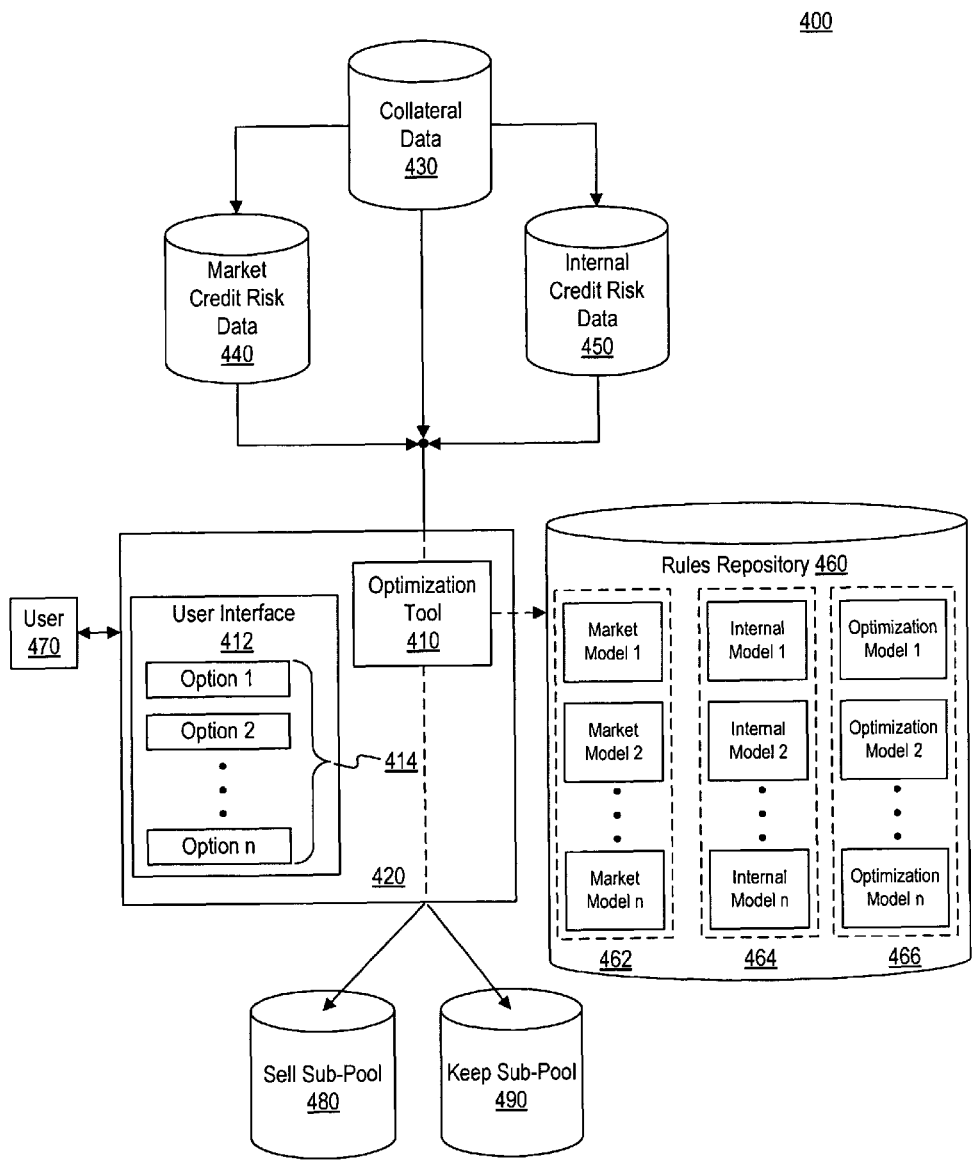
FIG. 4 is a block diagram illustrating an exemplary collateral selection architecture, in accordance with the principles of the present invention.

FIG. 4 is a block diagram illustrating an exemplary collateral selection architecture 400 in which the optimization selection process may be implemented. As shown, collateral section architecture 400 may include a computer 420 with an optimization tool 410 to determine what loans to keep and what loans to sell to the market. Inputs to the optimization tool 410 may include collateral data 430, market credit risk data 440, and internal credit risk data 450. The optimization tool 410 may be implemented in software, hardware, or a combination of the two. In addition, the optimization tool 410 may utilize rule engine technology. Rule engine technology may provide the ability to centrally store business logic in a rules repository 460, such as pooling criteria, so that it can be easily changed, for example, to quickly meet new customer demands, regulatory changes, and competition in the marketplace. The optimization tool 410 may execute the optimization selection process and may be communicatively connected to the rules repository 460, which may contain the rules used by the optimization tool 410.

Examples of collateral data 430 include the term of the mortgage loan, the interest rate, whether the mortgage loan has a fixed interest rate, adjustable interest rate, or balloon payment feature, the identity of the mortgage loan originator, the amount of the original loan balance, the mortgage loan purpose (e.g., purchase or refinance), the mortgaged property's characteristics (e.g., main residence or second home), whether the mortgage loan is seasoned or unseasoned, the geographic location of the mortgage property, the weighted average coupon, the weighted average maturity (e.g., the number of months left to maturity), the loan to value ratio (LTV), whether the mortgage loan has a small loan balance (LLB), the borrower's credit score, the type of borrower (e.g., investor or owner occupant), and the like.

The market credit risk data 440 may include data that represents the external credit risks or costs of the collateral to other buyers (e.g., a company, investor, or the like) of the collateral in the market. The market credit risk data 440 may also include data representing constraints on the types of loans that may be pooled into the sell sub-pool 480 and the keep sub-pool 490. For example, the constraints may require that the sell sub-pool 480 and the keep sub-pool 490 maintain an equal subordination percentage of loans with a certain credit rating or FICO score.

The internal credit risk data 450 may include data that represents the internal credit risks or costs of the collateral to the buyer (e.g., a company). The internal credit risk data 450 may vary from company to company. For instance, the internal credit risk data 450 may be based on investment guidelines or constraints of the buyer that are set forth by government regulations or charter requirements of a company. Specifically, an investment guideline or constraint of a company may limit the type of mortgage loans that a buyer may purchase. For example, such investment guidelines or constraints of a company may include, for example, limiting loans that may be purchased to loans with a value that is below a predetermined amount, loans wherein the borrower's FICO score is above a predetermined amount, or loans that are below a predetermined LTV.

Rules repository 460 may contain constraints defined in the form of rules, including when and how to use various models, such as market models 462, internal models 464, and optimization models 466. Market models 462 may include any available Rating Agency credit risk models, commercial off-the-shelf and dealers' credit risk models that are available for their respective subscribers and clients. Market models 462 may include financial representations produced by third party vendors that market participants typically subscribe and use for investment decisions. Internal credit risk models 463 may be developed in-house using proprietary knowledge information. Internal models 464 may include proprietary financial representations developed by market participants and used for investment decisions. Both market and internal models are generally developed using historical data and a variety of econometric/statistical techniques to correlate the outcome of interest with loan, borrower, and/or macroeconomic variables.

In one embodiment, the optimization selection process may be accessed buy a user 470 through a computer interface, such as a user interface (UI) 412. UI may allow the user 470 to create user profiles, view data, run the optimization tool 410, modify the composition of the sell sub-pool 480 and the keep sub-pool 490, and choose from the different market models 462, internal models 464, and optimization models 466 stored in the rules repository 460. The optimization tool 410 may use collateral data 430, market credit risk data 440, internal credit risk data 450, market models 462, internal models 464, and optimization models 466, and one or more options 414 to execute the optimization selection process to create a plurality of sub-pools, such as a sell sub-pool 480 and a keep sub-pool 490.

Figure 5:
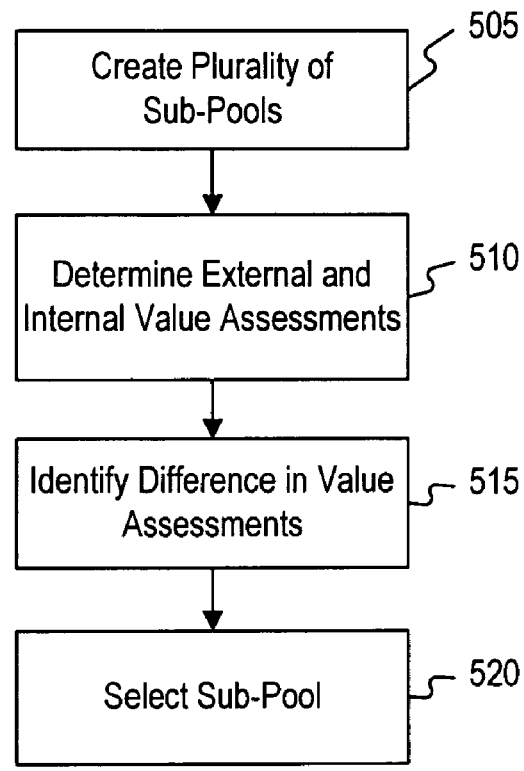
FIG. 5 illustrates a flowchart of exemplary steps performed by an optimization tool to execute an optimization selection process, in accordance with the principles of the present invention.

FIG. 5 is a flowchart of exemplary steps performed by the optimization selection tool 410 to execute an optimization selection process in accordance with principles of the present invention. The optimization selection tool 410 may create a plurality of sub-pools (step 505). In step 510, the optimization selection tool 410 may determine the external value assessment and the internal value assessment of a loan from the original pool of loans. In step 515, the optimization selection tool 410 may identify a difference between the external and internal value assessments. In step 520, the optimization selection tool 410 selects a sub-pool from the created plurality of sub-pools in which to place one or more loans based upon the identified differences.

Figure 6:
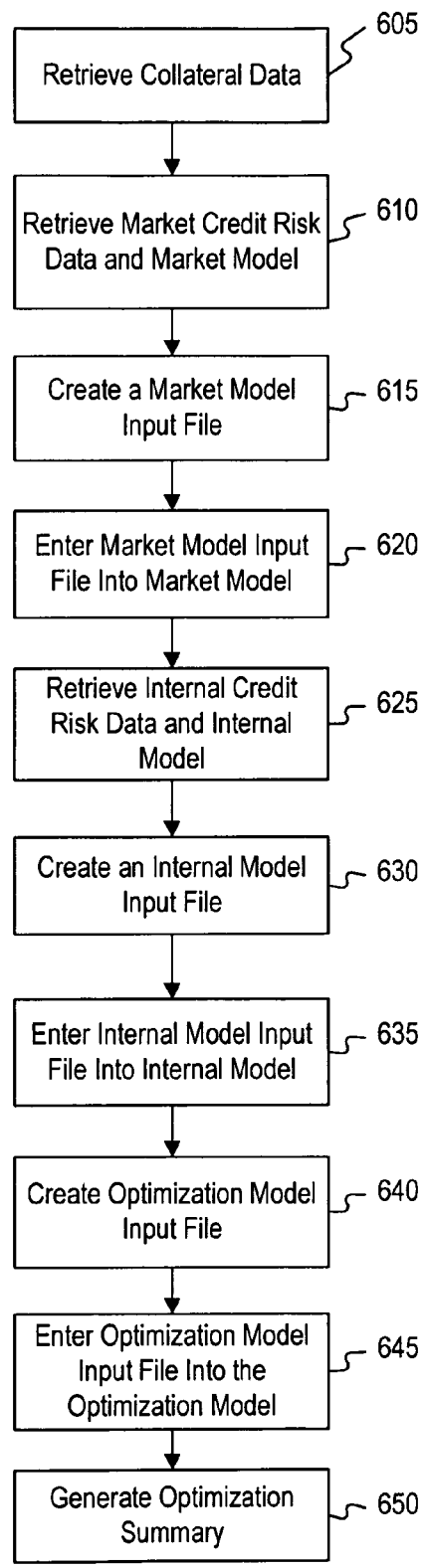
FIG. 6 illustrates another flowchart of exemplary steps performed by an optimization tool to execute an optimization selection process, in accordance with the principles of the present invention.

FIG. 6 is another flowchart illustrating in detail exemplary steps performed by the optimization tool 410 to execute an optimization selection process in accordance with principles of the present invention. In step 605, the optimization tool 410 may retrieve collateral data 430, such as data regarding a pool of loans and the characteristics of these loans.

In step 610, the optimization tool 410 may retrieve market credit risk data 440 and market model 462 from the rules repository 460. In step 615, in accordance with the data variables that may be required by the retrieved market model 462, the optimization tool 410 may parse the retrieved collateral data 430 and create a market model input file 710 as illustrated in FIG. 7. Variables used in the market model input file 710 may include the loan number, the loan size, the FICO score of the borrower, the LTV ratio of the loan, the interest rate of the loan, and the type of property ownership (i.e., investor or owner occupant). As illustrated in FIG. 7, when the borrower of a mortgage loan is an investor to the underlying property, the "Investor" column value is represented by the numeral "1", otherwise the borrower of a mortgage loan is an owner occupant, and the "Investor" column value is represent by the numeral "0." Although only these variables are listed in the market model input file 710, additional variables may be used as is required by the market model 462.

In step 620, the optimization tool 410 may enter the market model input file 710 into the market model 462 to thereby create a market model output file 720 as illustrated in FIG. 7. The market model output file 720 may include the g-fee that the market may charge to guarantee each loan based on the variables associated with that loan and the market credit risk data 440. For example, as shown in FIG. 7, for loan 1 in which the loan size is 100,000, the FICO score of the borrower is 600, the LTV ratio is 80, the interest rate is 6%, and the property is owned by an investor, the market may charge a g-fee of 10 bps to guarantee loan 1. On the other hand, for loan 4 in which the loan size is 100,000, the FICO score of the borrower is 700, the LTV ratio is 80, the interest rate is 6%, and the property is owner occupied, the market may charge a g-fee of 6 bps to guarantee loan 4.

In step 625, the optimization tool 410 may retrieve internal credit risk data 450 and internal model 464 from the rules repository 460. In step 630, in accordance with the data variables that may be required by the retrieved internal model 464, the optimization tool 410 may parse the retrieved collateral data 430 and create an internal model input file 810 as illustrated in FIG. 8. Variables used in the internal model input file 810 may include the loan number, the loan size, the FICO score of the borrower, the LTV ratio of the loan, the interest rate of the loan, and the purpose of the loan (i.e., purchase or refinance). As illustrated in FIG. 8, wherein the purpose of the loan is for a refinance, the variable refinance is represented by the numeral "1." On the contrary, when the purpose of the loan is for a purchase, the variable refinance is represented by the numeral "0." Although, only these variables are listed in the internal model input file 810, additional variables may be used as is required by the internal model 464.

In step 635, the optimization tool 410 may enter the internal model input file 810 into the internal model 464 to thereby create an internal model output file 820 as illustrated in FIG. 8. The internal model output file 820 may include the g-fee that the company may charge to guarantee each loan based on the variables associated with that loan and the company view of the associated credit risk. For example, for loan 1 in which the loan size is 100,000, the FICO score of the borrower is 600, the LTV ratio is 80, the interest rate is 6%, and the purpose of the loan is for a refinance, the company may charge a g-fee of 10 bps to guarantee loan 1. On the other hand, for loan 4 in which the loan size is 100,000, the FICO score of the borrower is 700, the LTV ratio is 80, the interest rate is 6%, and the purpose of the loan is for a refinance, the company may charge a g-fee of 8 bps to guarantee loan 4.

In step 640, the optimization tool 410 may combine the collateral data 430, the market model input file 710, market model output file 720, internal model input file 810, and internal model output file 820 to create an optimization model input file 910, as illustrated in FIG. 9. The optimization model input file 910 may be utilized as an input to an optimization model 466 stored in rules repository 460.

In step 645, the optimization model input file 910 may be entered into the optimization model 466 thereby executing the optimization selection process. As a result of the optimization selection process, the optimization model 466 may generate an optimization model output 920, as illustrated in FIG. 9. The optimization model output 920 may be in the form of an electronic or paper report or data identifying the mortgage loans assigned to each plurality of sub-pools, among other things. Specifically, optimization model output 920 may create a plurality of sub-pools and separate the plurality of mortgage loans included in the optimization model input file 910 into the plurality of sub-pools. For example, the sub-pools may include a sell sub-pool and a keep sub-pool, such as the sell sub-pool 480 and the keep sub-pool 490, illustrated in FIG. 4. As illustrated in the example provided in FIG. 9, the optimization model output 920 has separated mortgage loans 1 and 4 into a sell sub-pool and mortgage loans 2 and 3 into a keep sub-pool. The optimization model output 920 is determined by the optimization model input 910 and the type of optimization model 466 utilized. For example, an optimization model 466 may be utilized that minimizes appraisal risk, minimizes underwriting risks, minimizes credit costs, or maximizes proceeds.

An exemplary optimization model 466 that maximizes proceeds is represented as follows:

$$\text{Max}_x \sum_T \sum_i Price_T \times x_i \times LoanBalance_i \times TrancheSize_{T_i}$$

$$\text{s.t. } TargetBalance_{Low} \leq \sum_i x_i \times UPB_i \leq TargetBalance_{High}$$

$$AAA_{Low} \times \sum_i x_i \times LoanBalance_i \leq$$

$$\sum_i x_i \times LoanBalance_i \times AAA_i \leq AAA_{High} \times \sum_i x_i \times LoanBalance_i$$

$$CreditCost_{Low} \times \sum_i (1-x_i) \times LoanBalance_i \leq$$

$$\sum_i (1-x_i) \times LoanBalance_i \times CreditCost_i \leq$$

$$CreditCost_{High} \times \sum_i (1-x_i) \times LoanBalance_i$$

$$FICO_{Low} \times \sum_i x_i \times LoanBalance_i \leq \sum_i x_i \times LoanBalance_i \times FICO_i \leq$$

$$FICO_{High} \times \sum_i x_i \times LoanBalance_i$$

$$LTV_{Low} \times \sum_i x_i \times LoanBalance_i \leq \sum_i x_i \times LoanBalance_i \times LTV_i \leq$$

$$LTV_{High} \times \sum_i x_i \times LoanBalance_i$$

$$VarX_{Low} \times \sum_i x_i \times LoanBalance_i \leq \sum_i x_i \times LoanBalance_i \times VarX_i \geq$$

$$VarX_{High} \times \sum_i x_i \times LoanBalance_i$$

Price=Price of each credit tranche
LoanBalance=Loan amount of each loan
TancheSize=Amount or size of each credit tranche for each loan
TargetBalance=Target size of collection/pool of loans
AAA=AAA subordination amount for each loan
CreditCost=Internal view of credit risk for each loan
FICO=FICO score for each loan (based on borrowers)
LTV=Original loan to value for each loan
VarX=Any variables of interest in addition to FICO and LTV
x=loan to pool mapping decision variable The objective function of this exemplary optimization model is stated in the first line (maximization function) of the model above. The above model describes the amount of proceeds that a company could get by selling the loans to the market. In this case, the value $x_i$ would be equal to 1 when loan i is assigned to a sell pool, otherwise the value of $x_i$ would be equal to 0 when loan i is put into a keep pool.

The optimization model output 920 illustrated in FIG. 9 was produced using an optimization model designed to reduce the internal costs associated with the keep sub-pool while keeping the same market model results, same pool size, FICO, and LTV. In step 650, an optimization summary 930 may be generated that summarizes the result of using the optimization process.

Analysis of the optimization model input 910 illustrates that using the market model 462, the market view of the average g-fee to charge to guarantee the loan pool (i.e., mortgage loans 1-4) is 8 bps. Further analysis of the optimization model input 910 illustrates that using the internal model 464, the company's internal view of the average g-fee to charge to guarantee the loan pool is also 8 bps. The optimization summary 930 illustrates that by utilizing the optimization model 466 a plurality of sub-pools are created, wherein the market view of the g-fee required to guarantee these plurality of sub-pool of mortgage loans (i.e., the keep sub-pool and the sell sub-pool) remains the same as the original loan pool. Moreover, as illustrated in the optimization summary 930 both the keep sub-pool and the sell sub-pool contain an unpaid principal balance (UPB) of $200,000, exactly half of the original loan pool. Additionally, both the keep sub-pool and the sell sub-pool have a FICO score of 650, the average of the original loan pool, and a LTV ratio of 80. Accordingly, the optimization model 466 has achieved its designed objective of keeping the same market model results, same pool size, FICO, and LTV as the original loan pool. The optimization model 466 has also achieved its additionally designed objective of reducing the internal costs associated with the keep sub-pool. Specifically, as illustrated in the optimization summary 930 the internal view of the g-fee required to guarantee the keep sub-pool is 7 bps as oppose to the 8 bps required to guarantee the original pool of loans. Further, the internal view of the g-fee required to guarantee the sell sub-pool is 9 bps. However, the market may be willing to purchase the sell sub-pool as the market, using the market model 462, views the sell sub-pool as requiring only 8.0 bps to guarantee.

Returning to FIG. 4, in one embodiment, the optimization model 466 may be selected by a user, such as user 470. User 470 may select the desired optimization model 466 using UI 412 based on the desired objective of the user 470. For example, the desired objective of the user 470 may be to minimize the internal view of the credit costs associated with the keep sub-pool. Accordingly, the user 470 may select the optimization model 466 that is designed to produce that result.

In another embodiment, the user 470 may be able to modify, using options 414, the output of the selected optimization model 466 by adjusting certain variables of the model. For example, in the instance wherein an optimization model 466 with the designed functionality of minimizing the internal view of the credit costs associated with the keep sub-pool is selected, the user 470 may be able to set the range or level to which the credit costs is minimized. The user 470 may further adjust variables of the optimization model 466 to produce an optimization model output 920 that achieves results in accordance with mission goals of the company, for example, to purchase a predetermined number of mortgage loans in a particular low-income area to increase liquidity in that area. In certain instances, adjusting the variables of the optimization model 466 to achieve mission goals of the company may increase the company's internal view of the credit costs associated with keep-pool. Accordingly, the user 470 may be capable of running an optimized model 466 multiple times, adjusting different variables each time the optimized model 466 is run to attain the desired balance between the desired output objectives of the optimized model 466 (e.g., meeting mission goals and reducing credit costs).

In another embodiment, the user 470 may have the ability to select the source of the market credit risk data and the source of the internal credit risk data, such as the ability to access a variety of databases or files containing the relevant data, despite differences in format, field, layout, etc. In some embodiments, the user 470 may have the ability to edit the accessed data and make corrections to the data as needed, for example via UI 412.

A user 470 may execute, via the optimization tool 410, the optimization selection process through the use of a UI 412. The execution of the optimization selection process is performed in accordance with the various optimization models 466 selected from the rules repository 460. The various optimization models 466 may include, but are not limited to, models designed to minimize the g-fee on the keep sub-pool, maximize proceeds on the sell sub-pool, or maximize size on the keep sub-pool. The models may be selected by the user 470 at the time of execution of the optimization selection process or the models may be automatically selected by the optimization tool 410.

In another embodiment of the invention, the optimization model 466 may be designed with the functionality to optimize the cash flow of the mortgage loans within a pool of loans. For example, wherein a pool of loans includes mortgage loans with varying payment structures, such as interest only loan payment and principal and interest payment, a security may be created based on the timing of the payments from the pool of loans. Therefore, the optimization model 466 may not only determine what specific mortgage loans from the original pool of loans to place into a plurality of sub-pool of loans, but may instead determine what cash flow from a particular loan should be placed into a plurality of sub-pools. This optimization model 466 therefore is capable of leveraging the difference in the market view of the expectation of the timing of the cash flow from a mortgage pool and a company's internal view of the timing of the cash flow from that mortgage pool.

Although the above-described use of the optimization process is within the bulk process, the optimization process may also be used in the flow process. The flow process may require that all loans within a delivered pool of loans conform to certain characteristics, such as loan amount, payment terms, interest rate, loan term, and the like. For loans acquired through the flow process, the buyer will guarantee the loan for a predetermined g-fee, normally established through a long-term contract.

However, because the flow process is more of a long-term contract that sets forth a predetermined g-fee for mortgage loans that are delivered in conformance with predetermined guidelines set forth by the seller and the buyer, the optimization process is not executed at the time of delivery to determine a g-fee, but subsequent to delivery. Specifically, by executing the optimization process subsequent to each delivery, a historical average view of the costs during the term of the flow process contract may be obtained in order to determine whether a difference exists between the market view and the internal view of the credit risks associated with the mortgage loans delivered during the term of the flow process and whether there is an opportunity to leverage this difference.

Figure 10:
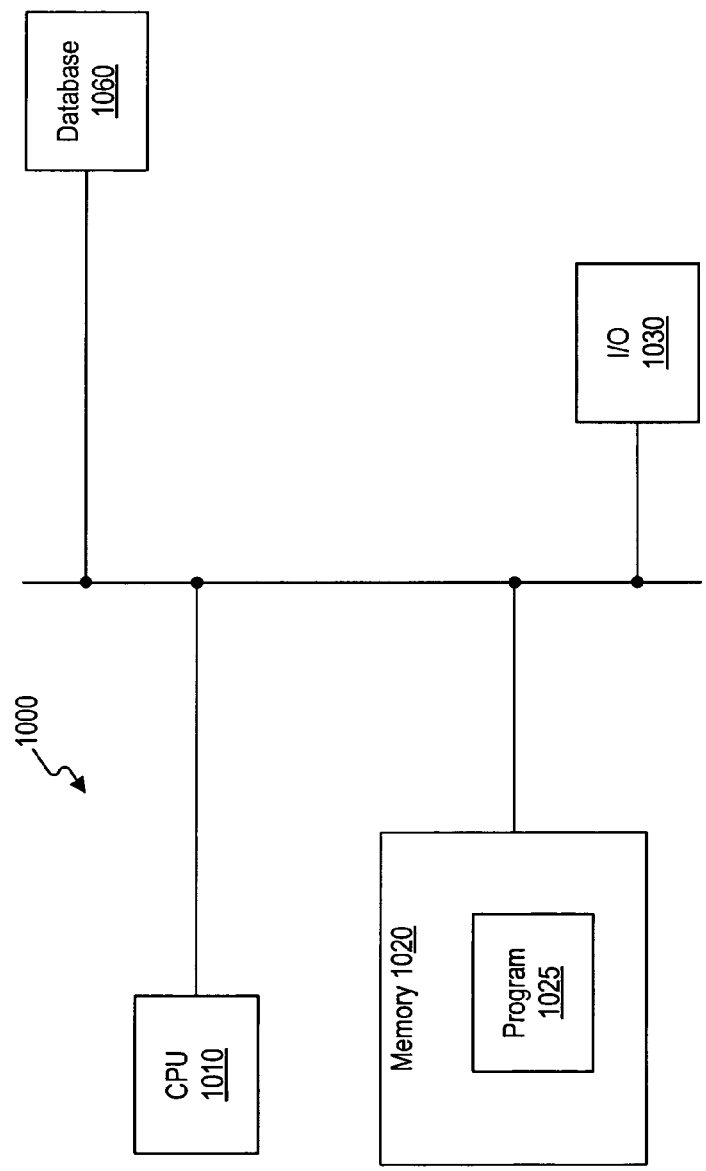
FIG. 10 illustrates an exemplary computing system that can be used to implement embodiments of the present invention, in accordance with principles of the present invention.

FIG. 10 illustrates an exemplary computing system 1000 that can be used to implement embodiments of the invention. The components and arrangement, however, are not critical to the invention. One of ordinary skill will recognize that embodiments of the invention may be implemented by computers or workstations organized as shown, organized in a distributed processing system architecture, or organized in myriad suitable combinations of software, hardware, and/or firmware.

As shown, system 1000 may include a number of components, such as a central processing unit (CPU) 1010, a memory 1020, an input/output (I/O) device(s) 1030, and a database 1060 that can be implemented in various ways. For example, an integrated platform (such as a workstation, personal computer, laptop, etc.) may comprise CPU 1010, memory 1020, and I/O devices 1030. In such a configuration, components 1010, 1020, and 1030 may connect through a local bus interface and access to database 1060 (implemented as a separate database system) may be facilitated through a direct communication link, a local area network (LAN), a wide area network (WAN) and/or other suitable connections.

CPU 1010 may be one or more known processing devices, such as a microprocessor from the Pentium family manufactured by Intel™ or a mainframe-class processor. Memory 1020 may be one or more storage devices configured to store information used by CPU 1010 to perform certain functions, operations, and steps related to embodiments of the present invention. Memory 1020 may be a magnetic, semiconductor, tape, optical, or other type of storage device. In one embodiment, memory 1020 includes one or more software application programs 1025 that, when executed by CPU 1010, perform various processes consistent with the present invention. For example, memory 1020 may include an optimization selection software application 1025 that, when executed by CPU 1010, allows a company to leverage differences between the market's view of the credit risks and costs associated with a piece of collateral and the company's view of the credit risks and costs associated with that piece of collateral. Memory 1020 may also include other programs that perform other functions consistent with embodiments of the invention, such as a program that groups identified collateral into plurality of sub-pools based upon the output of the optimization selection software application 1025.

Methods, systems, and articles of manufacture consistent with the present invention are not limited to programs configured to perform dedicated tasks. For example, memory 1020 may be configured with a program 1025 that performs several functions consistent with the invention when executed by CPU 1010. For example, memory 1020 may include a software application program that reads in collateral data, market credit risk data, internal credit risk data, market models, internal models, and optimization models. Memory 1020 may also include a software application program that executes an optimization selection process that creates a plurality of sub-pools in which to place one or more loans and generates an output that indicates which of the plurality of sub-pools to place the one or more loans. Alternatively, CPU 1010 may execute one or more programs located remotely from system 1000. For example, system 1000 may access one or more remote programs that, when executed, perform functions related to embodiments of the present invention. The configuration and number of programs implementing processes consistent with the invention are not critical to the invention.

Memory 1020 may be also be configured with an operating system (not shown) that performs several functions well known in the art when executed by CPU 1010. By way of example, the operating system may be Microsoft Windows™, Unix™ Linux™, an Apple™ operating system such as MAC OSX™, Personal Digital Assistant operating system such as Microsoft CE™, or other operating system. The choice of operating system, and even to the use of an operating system, is not critical to the invention.

I/O device(s) 1030 may comprise one or more input/output devices that allow data to be received and/or transmitted by system 1000. For example, I/O device 1030 may include one or more input devices, such as a network connection, keyboard, touch screen, mouse, microphone, and the like, that enable data to be input or received from a user. Further, I/O device 1030 may include one or more output devices, such as a network connection, display screen, printer, speaker devices, and the like, that enable data to be output or presented to a user. The configuration and number of input and/or output devices incorporated in I/O device 1030 are not critical to the invention.

Database 1060 may comprise one or more databases that store information and are accessed and managed through system 1000. By way of example, database 1060 may be an Oracle™ database, a Sybase™ database, or other relational database. One embodiment described above uses database 1060 to store collateral data, market credit risk data, internal credit risk data, market models, internal models, and optimization models. Systems and methods of the present invention, however, are not limited to separate databases or even to the use of a database as other organized collections of data or memory systems will serve as well.

The disclosed method, system, and computer program product may leverage the difference between the g-fee that the market will charge to guarantee a loan and the g-fee a company will charge to guarantee the loan based on its internal costs to thereby allow the company to make more informed decisions about which loans to keep and which loans to sell. Specifically, the disclosed method, system, and computer program product may, based on the leveraging of this difference, allow a company to determine which loans to place into sub-pools the return on which will be guaranteed by the company (i.e., keep sub-pools) and which loans to place into sub-pools, the return on which will be guaranteed by others (i.e., sell sub-pools). As a result, the disclosed method, system, and computer program product may provide an improved rate of return on equity and the ability to purchase more loans, thereby improving liquidity in the mortgage funding market and reducing costs to potential homeowners. In addition, the disclosed method, system, and computer program product may also enable a company to maintain a more consistent and continuous presence in the market for loans.

The foregoing description of possible implementations and embodiments consistent with the present invention does not represent a comprehensive list of all such implementations or all variations of the implementations described. The description of only some implementations should not be construed as an intent to exclude other implementations. Other embodiments of the invention will be apparent to those skilled in the art from consideration of the specification and practice of the invention disclosed herein. One of ordinary skill in the art will understand how to implement the invention in the appended claims in other ways using equivalents and alternatives that do not depart from the scope of the following claims. It is intended that the specification and examples be considered as exemplary only, with a true scope and spirit of the invention being indicated by the following claims.

What is claimed is:

1. A computer-implemented method of increasing a return on investment from a first pool of loans for a company, the method comprising:
   creating, by a processor, a first sub-pool in which to place loans from the first pool, the credit risk dependent return of which is guaranteed by the company at a first level;
   creating, by a processor, a second sub-pool in which to place loans from the first pool, the credit risk dependent return of which is guaranteed by the company at a second level, the second level being lower than the first level;
   determining, using the processor, an external value assessment for one or more loans from the first pool;
   determining, using the processor, an internal value assessment for the one or more loans;
   identifying, by the processor, a difference between the external and internal value assessments; and
   selecting, by the processor, the first sub-pool or the second sub-pool to place the one or more loans based upon the identified difference.

2. The computer-implemented method of claim 1, wherein the credit risk dependent return of the first sub-pool is guaranteed by the company at a first level of 100%, and the credit risk dependent return of the second sub-pool is guaranteed by the company at a second level of 0%.

3. The computer-implemented method of claim 1, further comprising:
   determining pool level external value assessments for the first sub-pool and the second sub-pool;
   comparing the pool level external value assessments to confirm that an objective of the company is met; and
   generating an output confirmation.

4. The computer-implemented method of claim 1, wherein selecting a sub-pool comprises applying one or more optimization models based upon an objective of the company and by applying one or more constraints.

5. The computer-implemented method of claim 4, wherein the objective is to generate a first sub-pool with an external value assessment which is substantially the same as the external value assessment of the pool of loans and a second sub-pool with an external value assessment which is substantially the same as the external value assessment of the pool of loans and a return on equity greater than that of the pool of loans.

6. The computer-implemented method of claim 4, wherein the objective is one or more of minimizing appraisal risks, minimizing underwriting risks, minimizing credit costs, or maximizing proceeds.

7. The computer-implemented method of claim 4, wherein the constraints comprise maintaining one or more of a predetermined AAA subordination amount, a minimum average FICO score, or a maximum average LTV for one or more of the plurality of sub-pools.

8. The computer-implemented method of claim 1, wherein the percentage of loans below a predetermined credit rating is the same for the first sub-pool, the second sub-pool, and the first pool.

9. A computer-readable medium including program instructions for performing, when executed by a processor, a method for increasing a return on investment from a first pool of loans for a company, the method comprising:
   creating a first sub-pool in which to place loans from the first pool, the credit risk dependent return of which is guaranteed by the company at a first level;
   creating a second sub-pool in which to place loans from the first pool, the credit risk dependent return of which is guaranteed by the company at a second level, the second level being lower than the first level;
   determining, using one or more processors, an external value assessment for one or more loans from the first pool;
   determining, using one or more processors, an internal value assessment for the one or more loans;
   identifying a difference between the external and internal value assessments; and
   selecting the first sub-pool or the second sub-pool to place the one or more loans based upon the identified difference.

10. The computer-readable medium of claim 9, wherein the credit risk dependent return of the first sub-pool is guaranteed by the company at a first level of 100%, and the credit risk dependent return of the second sub-pool is guaranteed by the company at a second level of 0%.

11. The computer-readable medium of claim 9, further comprising:

determining pool level external value assessments for the first sub-pool and the second sub-pool;

comparing the pool level external value assessments to confirm that an objective of the company is met; and generating an output confirmation.

12. The computer-readable medium of claim 9, wherein selecting a sub-pool comprises applying one or more optimization models based upon an objective of the company and by applying one or more constraints.

13. The computer-readable medium of claim 12, wherein the objective is to generate a first sub-pool with an external value assessment which is substantially the same as the external value assessment of the pool of loans and a second sub-pool with an external value assessment which is substantially the same as the external value assessment of the pool of loans and a return on equity greater than that of the pool of loans.

14. The computer-readable medium of claim 12, wherein the objective is one or more of minimizing appraisal risks, minimizing underwriting risks, minimizing credit costs, or maximizing proceeds.

15. The computer-readable medium of claim 12, wherein the constraints comprise maintaining one or more of a predetermined AAA subordination amount, a minimum average FICO score, or a maximum average LTV for one or more of the plurality of sub-pools.

16. The computer-readable medium of claim 9, wherein the percentage of loans below a predetermined credit rating is the same for the first sub-pool, the second sub-pool, and the first pool.

17. A system for creating a plurality of sub-pools from a first pool of loans for a company involved in the guarantee and securitization of the loans, the system comprising:

data storage devices for storing collateral data, market credit risk data, and internal credit risk data;

a rules repository for storing market models, internal models, and optimization models; and a computer, including an optimization tool, communicatively connected to the data storage devices and the rules repository, the optimization tool receives collateral data, market credit risk data, internal credit risk data, market models, internal models, and optimization models and executes an optimization selection process to create a plurality of sub-pools in which to place loans from the first pool of loans, wherein the plurality of sub-pools comprise a first sub-pool in which to place loans, the credit risk dependent return of which is guaranteed by the company at a first predetermined level, and a second sub-pool in which to place loans, the credit risk dependent return of which is guaranteed by the company at a second predetermined level.

18. The system of claim 17, wherein the plurality of sub-pools comprise:

a keep sub-pool in which to place loans, the credit risk dependent return of which is guaranteed by the company; and a sell sub-pool in which to place loans, the credit risk dependent return of which is not be guaranteed by the company.

19. The system of claim 17, wherein the first predetermined level is greater than the second predetermined level.

20. The system of claim 19, wherein the optimization selection process:

determines pool level external value assessments for the first sub-pool and the second sub-pool;

compares the pool level external value assessments to confirm that the desired objective of the company is met; and generates an output confirmation.

21. The system of claim 17, wherein the optimization tool executes the optimization selection process by applying one or more optimization models based upon an objective of the company and applying one or more constraints.

22. The system of claim 21, wherein the objective is to generate a first sub-pool with an external value assessment which is substantially the same as the external value assessment of the pool of loans and a second sub-pool with an external value assessment which is substantially the same as the external value assessment of the pool of loans and a return on equity greater than that of the pool of loans.

23. The system of claim 21, wherein the objective is one or more of minimizing appraisal risks, minimizing underwriting risks, minimizing credit costs, or maximizing proceeds.

24. The system of claim 21, wherein the constraints comprise maintaining one or more of a predetermined AAA subordination amount, a minimum average FICO score, or a maximum average LTV for one or more of the plurality of sub-pools.

25. The system of claim 17, wherein the percentage of loans below a predetermined credit rating is the same for the first sub-pool, the second sub-pool, and the first pool.

26. A computer-implemented method of increasing a return on investment from a first pool of loans for a company, the method comprising:

creating, by a processor, a plurality of sub-pools in which to place cash flow associated with particular loans from the pool;

determining, using the processor, an external value assessment for the timing of the cash flow associated with one or more loans from the first pool;

determining, using the processor, an internal value assessment for the timing of the cash flow associated with the one or more loans from the first pool;

identifying, by the processor, a difference between the external and internal value assessments; and selecting, by the processor, a sub-pool from the plurality of sub-pools to place the cash flow associated with the one or more loans based upon the identified difference.

27. A computer-implemented method of increasing a return on investment from a first pool of loans for a company, the method comprising:

receiving, by a processor, a plurality of loans through a flow delivery process over a predefined term;

periodically determining, by the processor, an external value assessment for one or more of the plurality of loans;

periodically determining, by the processor, an internal value assessment for the one or more loans;

periodically identifying, by the processor, a difference between the external and internal value assessments; and calculating, by the processor an historical average of the identified differences over the term of the flow delivery process.

28. A computer-implemented method for optimizing selection of collateral, the collateral comprising a pool of loans, the method comprising:

retrieving, by a processor, collateral data for the loans, market credit risk data, internal credit risk data, a market model, and an internal model;

creating, by a processor, a market model input file from the retrieved market credit risk data and market model and creating an internal model input file from the retrieved internal credit risk data and internal model;

entering, by the processor, the market model input file into the market model to generate a market model output file and entering the internal model input file into the internal model to generate an internal model output file;

creating, the processor, an optimization model input file from the market model input file, internal model input file, market model output file, and internal model output file;

executing, by the processor, an optimization selection process by entering the optimization model input file into an optimization model; and generating, by the processor, an optimization model output, the optimization model output including a plurality of sub-pools in which to place one or more loans from the pool of loans and an indication of which of the plurality of sub-pools to place the one or more loans.

29. The computer-implemented method of claim 28, wherein the plurality of sub-pools comprises:

a first sub-pool in which to place loans, the credit risk dependent return of which is guaranteed by the company at a first predetermined level; and a second sub-pool in which to place loans, the credit risk dependent return of which is guaranteed by the company at a second predetermined level, wherein the first predetermined level is greater than the second predetermined level.

* * * * *